United States Patent

Basfeld

[11] Patent Number: 5,820,934
[45] Date of Patent: Oct. 13, 1998

[54] PROCESS FOR PRODUCING VISCOSE HOSES BY PRECIPITATION

[75] Inventor: Klaus Basfeld, Walsrode, Germany

[73] Assignee: Wolff Walsrode AG, Walsrode, Germany

[21] Appl. No.: 836,335
[22] PCT Filed: Nov. 2, 1995
[86] PCT No.: PCT/EP95/04299
  § 371 Date: May 9, 1997
  § 102(e) Date: May 9, 1997
[87] PCT Pub. No.: WO97/14752
  PCT Pub. Date: May 23, 1996

[30] Foreign Application Priority Data

Nov. 14, 1994 [DE] Germany .................. 44 40 636.3

[51] Int. Cl.⁶ .................. B05D 3/04; B05D 3/10
[52] U.S. Cl. .................. 427/339; 264/557; 264/558; 264/559; 264/561; 264/562; 427/356
[58] Field of Search .................. 264/557, 558, 264/559, 561, 562; 427/339, 356

[56] References Cited

U.S. PATENT DOCUMENTS

| | | | |
|---|---|---|---|
| 4,164,536 | 8/1979 | Bentley | 264/173 |
| 4,317,794 | 3/1982 | Gord et al. | 264/559 |
| 4,808,439 | 2/1989 | Basfeld | 427/356 |

*Primary Examiner*—Michael Lusignan
*Attorney, Agent, or Firm*—Sprung Kramer Schaefer & Briscoe

[57] ABSTRACT

The present invention relates to a method for the production of a fiber-reinforced cellulose tube by continuous coating of a fibrous non-woven fabric with an alkaline viscose solution which is neutralized by means of an acid-containing precipitating liquid and is converted into regenerated cellulose, wherein on the path between viscose coating and immersion in the precipitating bath, aqueous, acid-containing precipitating agents are caused to act upon the fresh viscose tube within the tube for the purpose of stiffening and regeneration to form regenerated cellulose, the process being begun with the application of the precipitating liquid directly after conclusion of the embedding of fiber in viscose and the precipitating liquid being guided together with the tube with the aid of optionally fixed internal devices which are designed in such a way that they support the tube that has had precipitating bath applied to it and in the process maintain it in rounded shape, that the length of the inner preliminary precipitation path is designed to be up to 10 meters in length, preferably 2 to 6 meters, in order to achieve an intensive preliminary precipitation and the acid concentration is such that the partial stiffening becoming effective within the tube as a result of formation of regenerated cellulose does not hinder the uniform distribution of the aqueous outer viscose including embedding of fiber.

13 Claims, 3 Drawing Sheets

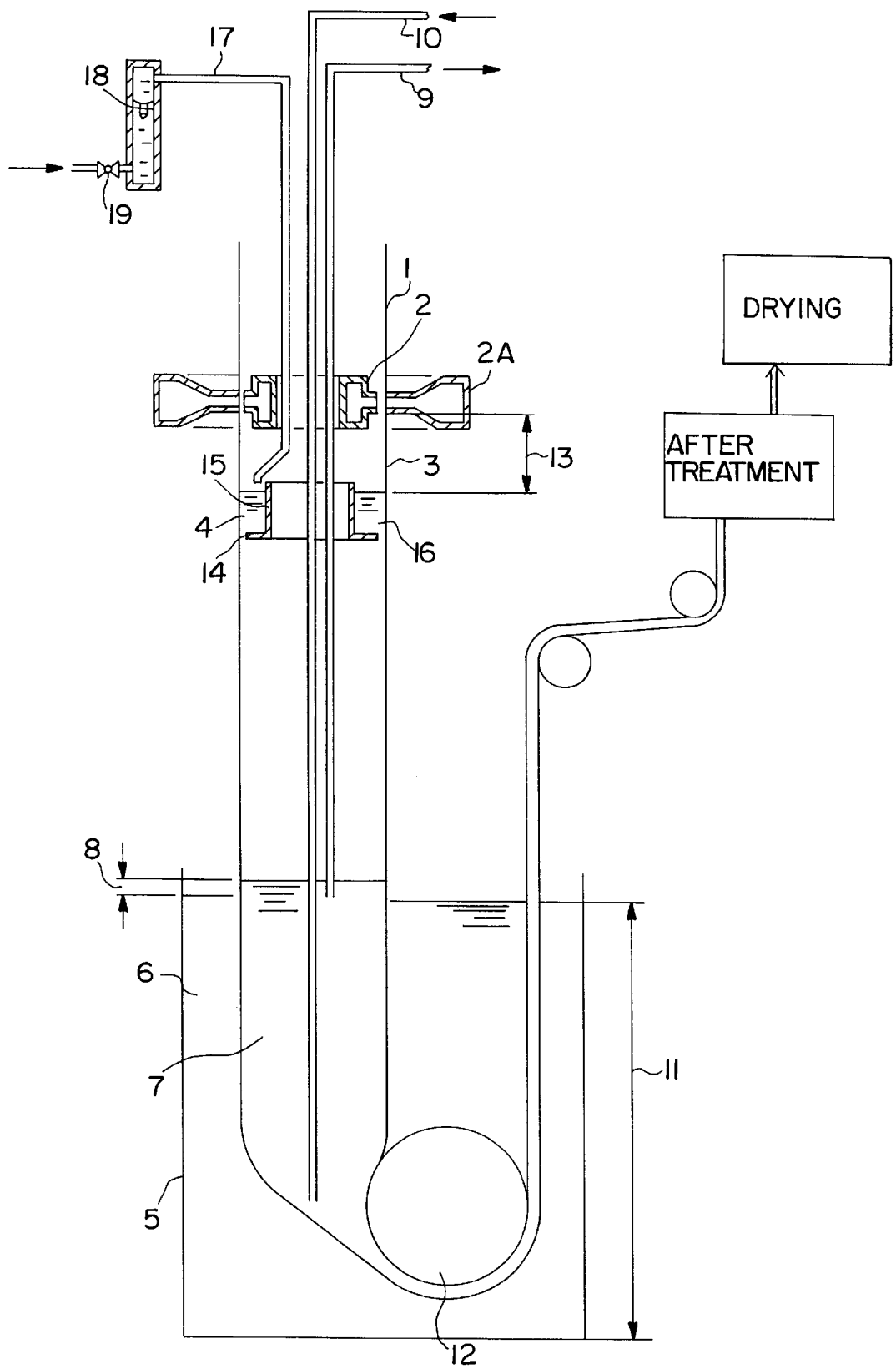
F I G. 1

PROCESS FOR PRODUCING VISCOSE HOSES BY PRECIPITATION

The invention relates to the production of fibre-reinforced cellulose casings. Such fibrous casings are produced, for example, by coating a fibrous non-woven fabric with viscose, by regeneration of the viscose into cellulose in a precipitation operation, by plasticising and drying the casing.

The web of non-woven fabric formed into a tube with overlapping seam is coated with viscose on one side or on both sides.

In this process it is important to achieve the embedding of non-woven fabric as quickly as possible in order to be able to initiate the following process step of precipitation.

An embedding of the non-woven fabric is achieved particularly rapidly and completely as a result of application of viscose on both sides if use is made to this end of a coating device such as is presented in EP-0 267 489 B1. One-sided coating has the disadvantage of a long saturation-time. In addition, the tube does not attain the uniform embedding and consequently the high degree of firmness of the casing that is coated with viscose on both sides.

The xanthate viscose that is conventionally used for the coating consists of around 85 wt-% water, and only 7 to 9 wt-% remain in the form of solids after the conversion into regenerated cellulose. Despite the extremely high viscosity, on account of the high water content viscose hardly offers any resistance to a long displacement in the case of a low application of force, which is important in connection with initiation of the precipitation operation. This is because very small changes in pressure within the tube in the course of the precipitation process result in changes in the structural configuration of the regenerated cellulose.

In the case of complete embedding of non-woven fabric a very delicate entity leaves the viscose nozzle if, with a view to production of non-woven fabric, use is made of the Manila hemp fibre conventionally employed and it is completely embedded in aqueous viscose.

In the case of the standard methods the tube leaving the viscose-coating device passes vertically downwards through an air gap before it is immersed in the precipitating bath.

The precipitating bath is located in a container having a depth of 1–4 meters with a deflection roller in the sump of the container, with the aid of which the running direction of the tube is reversed. While the precipitating liquid is passing through, an attempt is made largely to neutralise the lye that is contained in the viscose (eg, soda lye) in a quantity amounting to about 6 wt-% with acid (eg, sulphuric acid, optionally also organic acids). This neutralisation on both sides results in pronounced shrinkage stresses which are difficult to control. In this process a preliminary stiffening of the coagulation occurs first of all with subsequent conversion into cellulose.

Regeneration is effected on the outside and the inside of the tube almost simultaneously. This neutralisation on both sides results in pronounced shrinkage stresses which are difficult to control.

The bath that is required for the inner precipitation is continually supplied and exchanged by means of a system of rods for feeding and drainage.

In addition to the acid—mostly sulphuric acid—the precipitating baths also contain salts, mostly derived from the acid employed, that buffer the course of regeneration. By way of buffer salts in sulphuric-acid baths use is preferably made of sodium, ammonium and zinc sulphates.

This buffering-off is necessary, since the neutralisation between sulphuric acid and lye takes place very quickly and in the process a regenerated-cellulose skin forms that is only slightly acid-impermeable and particularly gas-impermeable.

As a result, the further course of the process of conversion from viscose into regenerated cellulose is greatly retarded: gas collects at the separation point between regenerated cellulose and coagulated viscose, said gas being capable of penetrating the layer of regenerated cellulose only in a limited quantity. These former separation points with collection of gas remain behind as light-reflecting areas after production of the casing is complete (designation "Lametta" [tinsel effect], Anglo-Saxon "shiny spots"). The number of small reflecting areas is a yardstick for the uniformity of the precipitation sequence.

Sulphuric acid is used extensively for the precipitation, since as a dibasic acid it is very effective and also inexpensive for the neutralisation of sodium lye in the viscose.

Of course, neutralisation that is necessary for the regeneration can be effected with any other organic or inorganic acid or mixtures thereof.

Elevating the acid concentration with a view to accelerating the regeneration also requires a considerable increase in the admixture of buffer salts.

Furthermore, in the course of the reaction or formation of regenerated cellulose, a release of water and contraction in the cellulose formed take place. This results in uneven distribution of solids and a considerable weakening of the casing. With a view to avoiding this, a pressure has to be built up within the tube in the course of the precipitation process. This is achieved by the level of the inner precipitating bath being maintained higher than the level of the outer precipitating bath, or alternatively by the specific weight of the inner precipitating bath being adjusted to be higher than that of the outer precipitating bath, or with a combination of both measures.

These small differences in pressure are already sufficient to maintain the tube adequately stretched in the course of the precipitation, due to the aqueous structure of the viscose.

The necessary measure of increasing the internal pressure unfortunately also has an effect on the overlapping seam of the fibrous non-woven fabric that is not yet enveloped by coagulated viscose during the first phase of the regeneration.

It slides apart very easily in the liquid phase of the viscose, which inevitably results in a weakened casing or even in its unsuitability for use.

Consequently, the arrangement of the inner precipitating bath is a compromise with a view to avoiding two possible ways in which faults can arise. Either sliding-apart of the seam or formation of defective points in the regenerated cellulose, which can be optically discerned as cellulose accumulations, designated here as viscose shrinkage folds or simply viscose folds.

Furthermore, the height of the inner precipitating bath determines how deeply the deflection roller can be arranged within the precipitating-bath container. The gas that is released within the tube lowers the specific weight of the liquid in the inner precipitating bath, as a result of which the internal pressure supporting the still labile casing is reduced. This reduction in internal pressure is additive with increasing height of the inner precipitating bath and limits the length of the tube between precipitating-bath surface and deflection roller in the precipitation container. In the case of a higher external pressure the unstiffened viscose tube becomes compressed and damaged.

The combination of precipitation, buffering by means of salts, stretching via inner precipitating bath and depth of precipitating bath establishes the speed of production.

On the deflection roller the tube has to be stiffened through its entire wall thickness to such an extent that structural displacements and hence damage no longer occur.

The following points are to be regarded as disadvantageous in the case of the standard method described:

An air gap between viscose-coating nozzle and precipitating-bath surface which is not utilised for the precipitation and serves only to distribute the viscose, as is presented particularly clearly, for example, in patent U.S. Pat. No. 4,164,536 for one-sided outer coating with viscose.

Formation of an only slightly permeable outer skin in the precipitating bath and hence a slow course of the precipitation process.

The severe shrinkage as a result of the practically simultaneous commencement of the neutralisation and precipitation process on the outside and inside of the tube with a risk of formation of viscose folds.

Restricted flexibility in connection with adjustment of the height of the inner precipitating bath or the level of the inner precipitating bath with a risk of formation of defects on the fresh casing.

Closely related thereto, the limited useful depth of the precipitating-bath container.

Resulting from this, an incomplete neutralisation at the deflection roller and collection of consumed precipitating bath in the ascending tube part and also collection of gas. The precipitation is only effective from outside in the case of the ascending tube.

The use of a precipitating bath with a high content of buffer salts which have to be removed from the tubular casing in the following washing process and which pollute the waste water.

A limited effect of inner precipitation and hence the necessity of bringing about the regeneration in time-consuming manner with the aid of the outer precipitation.

Use of different outer and inner precipitating baths. In critical production phases with many bursts of the tube, this leads to a mixing of the baths—that is to say, an unstable process. The preparation of two precipitating baths of differing consistency is demanding.

The limited production speed which is predetermined by the criteria previously listed.

The problems associated with the production speeds that are only low as a result of limits due to the method stimulates the search for alternatives which, as far as possible, do away with the restrictions that have been explained.

Such an alternative is described, for example, in patent EP 6 601.

Firstly a fibrous tube of non-woven fabric is coated with viscose in the conventional manner and is guided vertically downwards to a deflection roller.

Precipitation is effected with precipitating liquid which is applied externally via annular slots onto the viscose surface to be subjected to precipitation and as a result of gravity runs down into a collecting tank below the deflection roller.

Within the tube such a quantity of precipitating liquid is held that, under the weight thereof, the possibility is preserved of an internal tube passage for the purpose of gas equalisation between descending and ascending parts of the viscose tube.

The gas-communicating system presupposes that there is no immersion of the tube in an outer precipitating bath, and is consequently an integral part of the process sequence.

By this means the problems that exist in the case of the conventional immersion process in a precipitating-bath container are partially avoided. There is no longer the problem of controlling the level of the inner precipitating bath, the air gap that is not utilised for precipitation between viscose-coating nozzle and precipitating-bath surface is dispensed with, the restriction of the precipitation speed is partially dispensed with as a result of the formation of the only slightly permeable outer skin.

In the case of this method, however, other disadvantages have been accepted in order to achieve precisely these advantages.

One quite considerable disadvantage of the method is the load applied to the fresh viscose tube below the viscose-coating nozzle.

For example, if coating with viscose on both sides with full embedding of non-woven fabric has taken place, then an extremely labile, aqueous system is present.

After emerging from the nozzle the fresh viscose tube has to accept the entire weight of the viscose tube hanging below the nozzle until it reaches the deflection roller.

To this there is added the outer precipitating bath running down on the outer surface of the tube with the escaping spring water, where appropriate also precipitating bath on the inner surface and, proportionately, the weight of the inner precipitating bath below the deflection roller. Fluctuating loading acting upon the tube results in variable stretching of the labile structure in the running direction of the tube and influences the constancy of calibre.

Furthermore, the shrinkage behaviour has to be countered by means of an effective internal gas pressure: a further loading.

The method therefore presupposes the use of a highly lye-resistant fibrous non-woven fabric which is capable of accommodating the described load without damage to the overall structure.

Consequently, in restrictive manner use can only be made of non-woven fabrics that possess this lye-resistance.

This load can be reduced by shortening the precipitation path between viscose-coating nozzle and deflection roller. This in turn decreases the production speed, since by the time the deflection roller is reached a minimum resistance as a consequence of coagulation and regeneration has to have been achieved which rules out structural displacements in the wall of the casing.

In order to reduce the load downstream of the viscose-coating nozzle a one-sided coating with viscose would be advantageous for this precipitation method. This is because a fibrous non-woven fabric that is partially saturated, as when it leaves the viscose-coating device after an outer coating, possesses a higher lye resistance and therefore would be better able to accommodate the load exerted by the viscose tube.

Therefore a two-sided coating, which possesses—as is generally known—a higher resistance as a consequence of optimal embedding of non-woven fabric, would have to be dispensed with.

The production speed with this processing mode is also prespecified by a limited spacing between viscose-coating device and deflection roller. Liquid accumulating within the tube, such as spring water for example, collects in the region of the deflection roller and has to be drawn off from there by suction.

The suction height is limited—as is generally known—by the max. vacuum that can be generated, amounting to a water column of 10 m, in practice 9 m.

Owing to the salts resulting from neutralisation and acid buffering, the specific weight of the liquid to be drawn off by suction amounts to about 1.2 to 1.3 kp/ebm. Therefore the height of liquid that is capable of being drawn off by suction is limited to 7 to 7.5 m. Taking into account the position of the suction point above the viscose-coating device and losses of pressure, a spacing limitation arises between viscose-coating nozzle and deflection roller of 6 to 7 m in the case of effective inner extraction by suction.

This spacing has to be sufficient to give the viscose tube the requisite resistance, as a result of precipitation, to damage due to deformation arising as a result of deflection about the roller.

In order to provide protection against the formation of shrinkage folds in the viscose tube or regenerated cellulose, the method requires support by means of an internal pressure in the course of the precipitation from outside. The required internal pressure is already low for reasons associated with overlapping-seam loads. A disadvantage, since gases accruing internally in the course of the process which have a specific weight that is increased in relation to air are collected and change the internal pressure. The regulation of a very low pressure makes fluctuations unavoidable. These variable loads have an effect on the viscose tube.

Overall it is a question of a very delicate and complicated method. This does not only result from loads arising and the fluctuations therein.

Operation in the event of starting up again also has to be regarded as demanding. Only a tube that has already been precipitated adequately can be threaded via the deflection roller, in this connection a gas-pressure equalisation line has also to be introduced, the supporting air pressure has to be built up in relation to the external atmosphere with the aid of a separation device.

Consequently, in the case of the system according to patent EP 6 601, the following aspects of the method are problematical:

The complexity of the method.

Its delicate nature as a consequence of uneven and high loads on the fresh tube due to dead weight and supporting air.

Limited possibility of using non-wovens as a result of a high requisite lye resistance. Particularly problematic is the use of thin non-woven fabrics with a large quantity of applied viscose.

Limitation of the precipitation path by the restricted suction height of the inner precipitating bath.

Downstream of the deflection roller no inner precipitation is possible any longer. The precipitation process is consequently very considerably limited to the outer precipitation. For this purpose long precipitation paths are required which are associated with high expenditure on apparatus.

The necessary use of supporting air, with the problems of sealing.

Effect of the supporting air with the fluctuations therein on displacements of the seam floating in viscose liquid. A displacement of the seam can result in the casing becoming unusable.

Precipitating liquid that is applied externally and that runs down decreases the desired surface smoothness.

Restricted production speed as a result of loading of the freshly viscose-coated tube and limiting height for the extraction by suction from the inner precipitating bath.

The description of the problems associated with the method on the basis of two fundamental examples shows the limits that are placed on the production of cellulose tubes in the first precipitation stage.

The first precipitation stage determines the speed of production and hence the economy of manufacture.

All the process stages that follow conventionally are dependent on dwell-time and therefore dependent only on the amount of space and the investment capital that have been made available.

The production speeds in the course of the manufacture of fibre-reinforced cellulose casings amount to less than 20 m/min on average.

An increase in the production speed would yield considerable savings in connection with process operation and repair maintenance as a result of a reduction in mechanical and metrological equipment for a reduced number of skeins.

It is therefore the object of the invention to achieve production with increased production speed. It is achieved by avoiding the known existing restrictions in the first precipitation process.

In particular it is a principal characteristic of the method to avoid critical limiting regions with rapid formation of defects—for example, displacements of the seam or formation of viscose folds.

The method ensures simplified operation, which distinguishes it advantageously in relation to the manufacturing methods that have been described.

The raising of the production speed is achieved with simple equipment, as a result of which the retrofitting of already existing installations is made possible in straightforward manner.

The method is based on the known precipitation system with precipitating-bath container, outer and inner application of precipitating bath to the viscose tube.

The known methods have, as previously described on the basis of an example, only really short inner precipitation paths. The disparity between inner and outer precipitations results—as is generally known—in a basic inner bath downstream of the deflection roller, the neutralisation of which has to be effected with the aid of the acid of the outer precipitating bath.

This results in very long precipitation paths. Waste arises in connection with the removal of basic inner precipitating baths.

In the case of the new method the flaws due to inadequate inner precipitation can be avoided.

The inner precipitation is effected directly on the fresh tube after it leaves the viscose-coating nozzle.

Contrary to expectation, an application of precipitating bath within the tube after the covering with viscose results very quickly in stiffening of the tube with release of precipitating gas.

This stiffening of the tube in the region of the precipitating-gas atmosphere is so effective that the freshly precipitated tube can be drawn 1 to 2 seconds after leaving the viscose-coating nozzle with the aid of supporting annular bodies without damaging the inner surface of the tube, and the frictional force that is applied in the process is capable of accommodating the weight of the tube located underneath.

Hence the loading of the fresh tube with viscose after coating has been concluded becomes less than that which is conventional in the case of the standard method or other known methods.

Also surprising is the fact that the embedding of fibre as a result of subsequent swelling into the outer layer of viscose is not impaired by the inner precipitation. It has furthermore been observed that in the case of one-sided preliminary precipitation within the tube under regenerating-gas atmosphere use can be made of increased acid concentrations. This had not been expected initially, since conventionally an increased acid concentration, while maintaining the quantities of buffer salt per liter of precipitating liquid, brings about the formation of precipitation bubbles (shiny spots).

The unexpected possibility of raising the acid concentration and the free escape of gas in the absence of counterpressure exerted by a column of liquid consisting of precipitating bath causes the precipitation on the inner surface of the casing to proceed in greatly accelerated manner.

Since, as a result, the firmness of the tube quickly rises with increasing distance from the viscose-coating nozzle, repeatedly bearing supporting rings can be arranged within the tube which make the use of supporting air superfluous.

It has become evident that the internally precipitable tube length above the surface of the precipitating bath is only limited by the requisite exchange of liquid within the tube by conducting away the column of inner precipitating bath by means of a system of rods for extraction by suction.

Consequently the pre-regeneration path will have a length of up to 7 m if it is desired to operate high production speeds and operation is proceeding subject to extraction by suction. 6 to 7 meters can be overcome with the aid of known suction equipment.

With suitable pump equipment, which can preferably be introduced into the space available in the case where large calibres are being produced, these distances can be extended in accordance with the pump pressure.

Inner precipitation paths of 5 meters in the case of the standard method—that is to say, from the immersion surface as far as the deflection roller—already result in halting the release of gas as a consequence of static counterpressure of the precipitating bath at the bottom of the precipitation container.

Upon immersion of the internally pre-precipitated tube in the precipitating liquid the intensive conversion of the viscose into regenerated cellulose that has previously taken place has resulted in a diminution of further release of gas.

Within the tube small changes in the specific weight only occur in the case of diminished release of gas within the inner precipitating bath. The tube can no longer be compressed—as it can in the case of the standard method—with increasing height of the inner precipitating bath, especially since an intensive release of gas begins within the outer precipitating bath upon initial precipitation of the outside of the tube.

In addition, the tube is so stiffened or stable that damage to the casing—as a result, for example, of displacements of the seam or viscose folds—do not occur.

It is not comparable with the unstable fresh viscose tube under the influence of two-sided, inner and outer, intensive precipitation, proceeding simultaneously, of the standard technique.

This precondition makes it possible in the case of the new methods to design the depth of the precipitating bath as required as far as the deflection roller.

The depth of the precipitating bath can consequently be chosen in such a way that secured acidification of the entire tube is achieved before it reaches the deflection roller at the bottom of the precipitating bath. Such a tube is particularly insensitive to lasting deformation in the course of deflections via the roller under very extreme loading conditions.

It is particularly significant that, as a consequence of acidification, the precipitation process continues on both sides downstream of the deflection roller. As is generally known, in the case of the standard methods with intensive outer precipitation in the ascending casing tube an inner filling of the tube which is basic to a greater or lesser extent accumulates as a function of depth of precipitating bath and production speed.

The intensive outer precipitation in particular in the region downstream of the deflection roller displaces residual lye into the inside of the casing.

So it is surprising that the new method has acid precipitating liquid within the tube and said liquid is also maintained irrespective of the production time. Consequently, opening of the freshly precipitated tube for the purpose of removing collected basic residual liquid is dispensed with.

Evidently the regeneration from the inside of the tube that predominates in the course of the initial precipitation results in a reversal of the displacement of residual lye from the inside to the outside.

From the course of the process it also follows that downstream of the deflection roller only a considerably reduced quantity of gas is released within the tube.

In the case of the standard method it is necessary, in relatively brief time sequences, for the gas that has collected within the tube to be removed by opening the tube. These tube interruptions have to be coupled again in elaborate manner for the consequent processes, they result in waste and production restrictions at all stages until the final processor is reached. In the course of the production of the cellulose tubes using the wet process the removal of gas requires the maximum operational effort.

The new processing mode or precipitation technique enables the production of endless tubes of 4-fold or 5-fold length.

This results in reduced expenditure on operation, a reduction in waste and uniform product quality.

The method fully utilises the entire distance between viscose-coating nozzle and deflection roller in the precipitating-bath container which, as is conventional with this method, is of very deep construction with a view to conversion of the tube.

A fibrous non-woven fabric with overlapped seam is preferably coated on both sides with viscose in a viscose-coating device. In this connection more than 70% of the viscose is usually located on the outside of the fibrous non-woven fabric.

After leaving the viscose-coating nozzle the viscose tube passes through a path with inner precipitation and is then immersed in the precipitating bath for the main precipitation.

The length of the path is limited by the maximum suction height of 6 to 7 meters between the level of the inner precipitating bath and the outlet above the viscose-coating nozzle if no additional conveying means find application. In the case of the present method an attempt is made to utilise this path over its full length for the purpose of inner precipitation.

The freshly viscose-coated tube extending vertically downwards passes, a short distance downstream of the viscose-coating stage, a preliminary precipitating bath within the tube.

In this connection so much precipitating bath is applied onto the inside of the tube as to result in viscose coagulation and formation of a layer of regenerated cellulose inside.

In the course of the inner precipitation the layer of outer viscose remains untouched. Its precipitation is effected only after immersion in the precipitating liquid within the precipitating-bath container. This has the advantage that the outer viscose, which for the most part predominates quantitatively, can become homogenised over the free path between viscose-coating nozzle and precipitating-bath container.

The homogenisation of the surface represents a desirable effect. After the outer precipitation a particularly flat, smooth surface is obtained. This is a quality criterion indicating that the casing is particularly uniformly stable and capable of sliding. The transparency of, for example, coarse-grained raw sausage meats is increased, which is to be rated as a particular quality criterion.

The inner partial precipitation results in stiffening of the inside of the tubular casing. Coagulation of the viscose occurs very rapidly in particular in the critical seam region of the overlapping of non-woven fabric.

This is because, as a consequence of the double thickness of non-woven fabric in the seam and the diminished application of inner viscose, the inner-viscose covering layer is particularly thin and can be thoroughly hardened rapidly.

In practical trials it has turned out that the inner precipitation can be effected suitably with increased acid concentrations of around 100 g/l and buffer-salt contents between 200 and a maximum of 300 g/l. As a result a pronounced regeneration layer is formed, surprisingly without the formation of precipitation bubbles despite the unusually high acid loading.

The advantages of this pronounced layer of regenerated material on the inside of the tube are many:

1. A stable tube is formed which is borne by the inner layer prior to entering the precipitating bath of the precipitating-bath container.

2. The inner layer of regenerated material retains adequate permeability for the progress of the precipitation process.

3. Prior to immersion in the precipitating bath a partial regeneration has already begun. The escape of gas within the tube is restricted. This is desirable, since regenerated gas accumulating downstream of the deflection roller within the tube collects in the ascending branch of the tube and, depending on the quantity formed, has to be removed by opening the tubular casing. Such "incisions" are undesirable, since they cause interruptions and waste in all consequent processes.

4. On account of the partial precipitation and regeneration of the tube that have been carried out, it is not necessary to introduce supporting gas within the tube with a view to preserving the stability of the casing.

The actual precipitation process with application of precipitating bath on both sides is reached by an internally intensely pre-precipitated viscose tube which is already intrinsically stable.

Conventional difficulties in connection with the immersion in the precipitating bath, caused by fluctuations in the precipitating-bath column within the casing, no longer apply, since seam and tube wall already possess a stable regenerated-cellulose structure.

For example, tests have shown that in the state of immersion in the precipitating bath the tube is capable of being loaded on the inside with a column of precipitating bath 30 cm in height without displacements of the seam occurring.

Comparable precipitation conditions without inner preliminary precipitation already result in displacements of the seam at 30 mm.

The precipitation process in the precipitating bath therefore becomes independent of the conventional problems associated with precise control of the difference between the levels of the inner and outer precipitating baths.

Particularly significant is the phenomenon that the internally pre-precipitated tube can be precipitated from outside with high acid concentrations in connection with low admixed quantities of buffer salts which in the case of the conventional method result with absolute certainty in the "tinsel effect" and in extreme restriction of the precipitation speed.

By reason of the high degree of stability of the viscose tube with stiffening of the overlapping seam of the tube, in the course of immersion into the precipitating-bath container the level of the inner precipitating bath in relation to the level of the outer precipitating bath can to a considerable extent be adjusted in height to any value without damaging the tube. This enables the use of a particularly deep precipitating-bath container, since the internal pressure in the tube is capable of being built up as required by means of the level of the inner precipitating bath.

It is no longer necessary to make use of a different precipitating bath, having different density for example, for outer and inner precipitation.

Hence the precipitation method according to the invention offers the possibility of secured production at almost any production speed.

One particular advantage of the method is the rapid continuous precipitation or conversion of the viscose tube into regenerated cellulose that it is possible to achieve. In this connection the continuous precipitation from the inside of the tube is considerably restricted in the case of the methods known hitherto.

Until the first deflection roller has been reached, the continuous precipitation has only proceeded to a small extent. In the case of the conventional method it has been demonstrated that basic liquid collects in the tube downstream of the deflection roller.

This means that a major part of the precipitation downstream of the deflection roller has to take place via the outer tube wall only. This type of continuous precipitation only from outside delays the further progress of the regeneration, for which purpose increased expenditure on apparatus is necessary for a greatly extended dwell-time.

With the aid of the method that has been presented the overall regeneration-time is greatly shortened, since the inner precipitation of the viscose tube is considerably lengthened, especially since the method is based on the use of a long air gap with inner precipitation between viscose-coating device and precipitating-bath surface and also of a deflection roller situated at a low level in the precipitating-bath container.

In total this also means an increasing release of regenerating gas within the tube until the deflection roller is reached.

Further indications of advantages of the method:

Precipitation with a low content of buffer salts eases the burden on the subsequent washing process and the waste water.

In the case where ammonium sulphate is used by way of buffer a considerable reduction in relation to the use of acid is possible.

The regenerating process proceeds to a considerable extent in a region having a small area. As a result, the regenerating gas can be withdrawn in concentrated form and reprocessed.

The large volume of the precipitating bath in the precipitating-bath container ensures highly constant precipitation conditions, since the replenishment of consumed substances results only in small variations. It is even possible to cope with failures of dosing devices with the aid of longer repair periods.

Hence, with a measure that is relatively simple and that is easy to install, the bottleneck of the first precipitation in the course of the production of fibre-reinforced viscose tube is considerably reduced.

For completeness it should be added that the inner precipitating bath can be applied in a great variety of ways without influencing the effect. The spacing of the first precipitating-bath application within the tube from the viscose-coating nozzle will amount to less than 0.5 meters or will be effected at most 1 second after the application of viscose.

Only in the case of viscose-coating devices that operate poorly will these times be exceeded.

A multi-stage application, in two stages for example, includes in the first place the safety aspect of ensuring uniform application of the precipitating bath.

In particularly preferred manner several application and distributor devices will be arranged within the tube which, at the same time, provide a supporting function for the initially labile fresh tubular casing.

In this connection it is an integral part of the method to optimise or to vary acid and acid concentrations with buffer salts in conformance with the progress of the process of regeneration of the viscose into cellulose.

The preliminary precipitation path can also be utilised for calibration of the pre-precipitated tube. In this connection the already precoagulated and partially stiffened tube is drawn over a calibrating ring. The outer layer of viscose is not impaired in this process.

The following description portrays the process sequence.

FIG. 1 represents a schematic sequence of the process.

Figure 2:
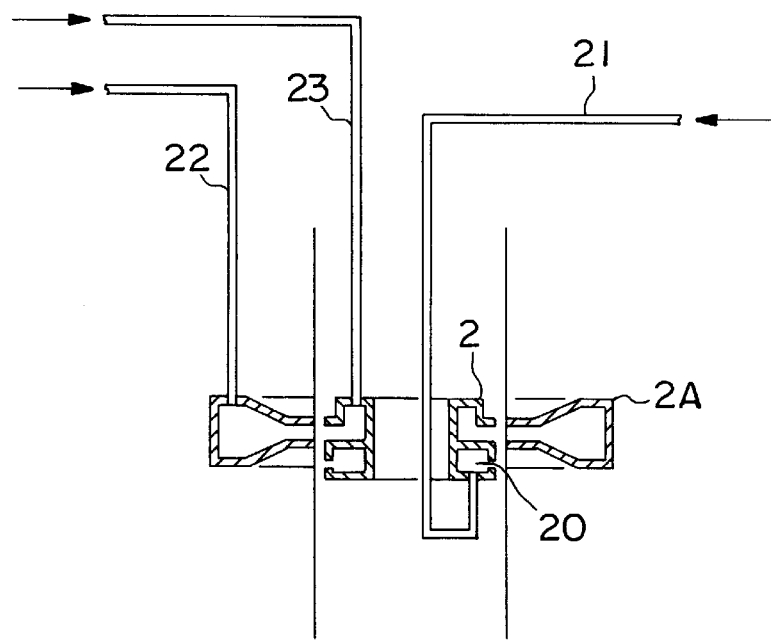
FIG. 2 shows a combination of the preliminary precipitating bath with the viscose-coating nozzle.

In the representation according to FIG. 1, 1 denotes the fibrous non-woven fabric with overlapped seam formed into a tube, said non-woven fabric being moved vertically downwards continuously.

The viscose coating is effected in the viscose-coating nozzle, consisting of an outer nozzle 2A and an inner nozzle 2I. Viscose-conveying devices and supply lines are not represented.

After leaving the viscose-coating nozzle, the freshly viscose-coated tube arrives at the preliminary precipitating bath 4, arranged within the tube. After this the actual precipitation takes place in the precipitating-bath container 5. The precipitating-bath container is filled with the outer precipitating bath 6, the inner precipitating bath 7 is located within the tube. The tension within the tube that is required in connection with the conversion of viscose into cellulose is brought about by the level of the inner precipitating bath 8, which is increased in relation to the outer precipitating bath. It is controlled by means of the suction device 9 and the precipitating-bath supply 10. In this connection this circuit provides for continual renewal of the consumed inner precipitating bath. The precipitation with inner and outer precipitating bath depends on the dwell-time, determined by the depth of immersion 11. After the immersion depth has been attained, reversal of the running direction of the sufficiently hardened tube is effected via the deflection roller 12, after leaving the precipitating-bath container 5 the tube passes, usually continuously, through the subsequent stages of the process.

The preliminary precipitating bath 4 is located between the viscose-coating nozzle and the surface of the inner precipitating bath. The spacing 13 between viscose coating and inner preliminary precipitation is dependent on the quality of the embedding of fibre in the course of the two-sided coating. The more rapidly the embedding is concluded, the sooner can regeneration of the inner surface take place.

The preliminary precipitation will begin a short distance below the nozzle, the spacing 13 will usually be very small.

In the representation the preliminary precipitating bath 4 consists of a disk 14 which is firmly connected to a cylinder 15. Both parts form, together with the viscose tube 3, an annular space in which the precipitating bath 16 is located which brings about coagulation and preliminary precipitation. Replenishment of the precipitating bath 16 is effected via the supply line 17. In this connection the quantity supplied is controlled with the aid of a flow meter 18 and adjusted with the aid of a control valve 19. Hence the degree of inner precipitation prior to the main precipitation can be controlled.

FIG. 2 shows an embodiment example in which the preliminary precipitating bath is applied directly following the inner viscose coating by means of nozzle 2I via a ring nozzle 20. For reasons of simplified attachment of the nozzle, both devices are connected to one another so as to form a complex. With this equipment it is particularly significant that a very rapid embedding of the non-wovens employed is achieved.

In relation to FIG. 1 the replacement of the inner viscose-coating nozzle 2I by the combination according to FIG. 2 is a further optimised solution of the inner precipitation. By this means a two-stage precipitating-bath treatment is achieved. 22 and 23 are the lines for supplying viscose to the viscose-coating nozzles. The provision of precipitating liquid is effected via 21.

Figure 3:
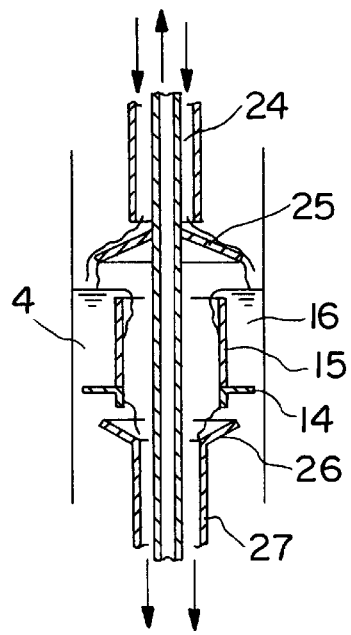
FIG. 3 shows the supply of inner precipitating bath to the preliminary precipitating bath.

FIG. 3 shows another embodiment example. The supply of the entire inner precipitating bath is effected via pipe 24. Via a distributor plate 25 the entire inner precipitating bath reaches a receiving vessel 4 for precipitating bath for the purpose of preliminary precipitation which is constructed in analogous manner to that from FIG. 1. The precipitating liquid that overflows inwardly via the edge of the cylinder is received by a funnel 26 and conveyed into the pipe 27 directly connected to it. The opening in the pipe 27 terminates in the inner precipitating bath, into which the overflow precipitating bath from the preliminary precipitating bath is conveyed.

Another variation is the transportation of the inner precipitating bath from pipe 27 onto a distributor plate such as represented by 25. The further handling of the precipitating bath is effected as described previously. In this way the precipitating liquid is supplied to the inner precipitating bath 7 in cascading manner as far as the surface of the precipitating bath in the region of the precipitation container 5.

Figure 4A:
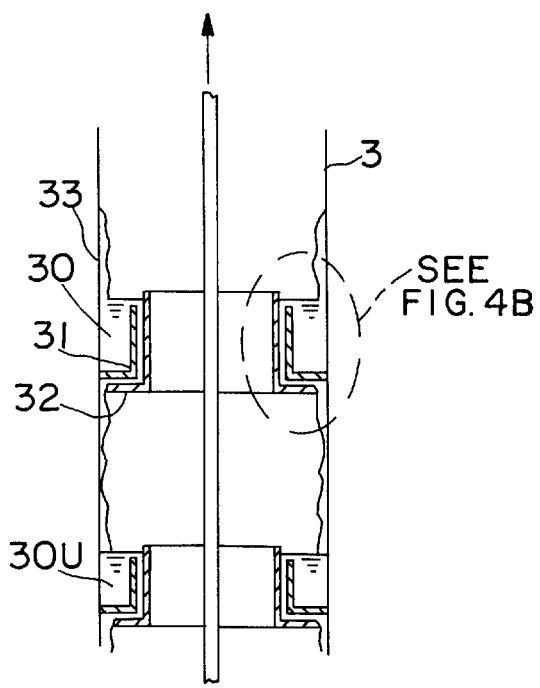
FIG. 4 shows a precipitating-bath distribution and casing-supporting device.
Figure 4B:
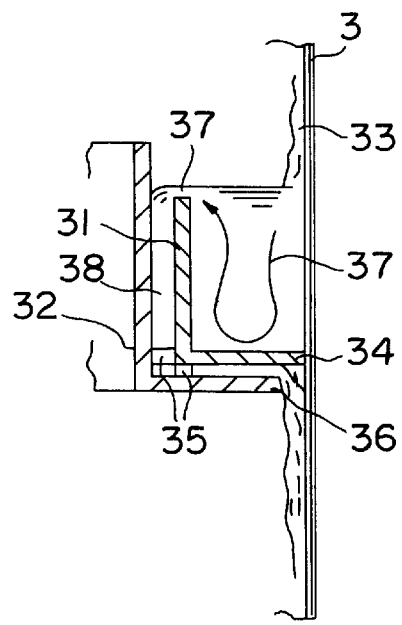

A further cascade-type handling of precipitating liquid is represented in FIG. 4. The precipitating liquid 33 flows, for example after leaving the nozzle 20 in FIG. 2, on the inside of the tube of the viscose-coated fibrous non-woven fabric 3. It is retained in an annular collecting trough 30. The latter consists of an outer trough 31 and an inner trough 32. The two troughs are centred in relation to one another with the aid of burls 35. Between the burls a free space exists, through which the liquid passes. The outer trough 31 receives the precipitating liquid 33, the circular edge 34 being in contact with the viscose tube 3. A ring of precipitation liquid is formed since the liquid passing through between annular edge 34 and tube 3 amounts to only a fraction of the feed quantity 33. The ring of liquid brings about homogenisation of the application of precipitating agent to the inner tube. It serves at the same time, together with the circular edge 34, to support the tube which is in the process of being regenerated and in this way avoids the formation of shrinkage folds in the course of precipitation. The filled outer trough 31 overflows its annular edge 37.

The overflowing precipitating liquid is distributed in the annular space 38 between outer and inner troughs and emerges uniformly via the circular edge 36. The difference in diameter between the circular edges 34 and 36 ensures the formation of an annular gap, via which the uniformly distributed precipitating liquid is again applied onto the inner wall of the casing tube.

The movement of the viscose tube 3 in relation to the fixed collecting trough 30 provides for a circulation of liquid, as indicated symbolically by means of the curved arrow 37.

The contact of the circular edge 34 with the tube brings about the removal of consumed filling bath. Below the collecting and distributing device 30 that has been described, another identical collecting trough 30U is represented.

Several of these devices are located on the path between viscose coating and precipitating-bath container. They have the task of ensuring uniform distribution of the precipitating liquid and also support of the viscose tube for the purpose of avoiding shrinkage folds.

The precipitating-bath application devices described here are essentially intended to represent the principle behind the implementation of the process sequence. A large number of other distribution devices and combinations are conceivable and can be implemented.

I claim:

1. In the method of producing a continuous fiber-reinforced cellulose tube which comprises the steps of:
   1) continuously coating a fibrous non-woven fabric continuous tube having an overlapping seam with an alkaline viscose solution, which thereby becomes embedded in said fabric,
   2) continuously passing the so-coated fibrous non-woven fabric tube from step 1) through an airspace to a bath of acid-containing precipitation liquid, and passing said tube through said bath to neutralize said alkaline viscose solution, said bath having, at the bottom portion thereof, a deflection roller over which said tube passes and which changes the direction of travel of said tube to thereafter pass out of said bath,
   3) then passing said tube to a washing step wherein it is washed with water to remove salts formed in said neutralization step, and
   4) then passing said coated fibrous non-woven fabric tube through a bath which contains plasticizers, and subsequently drying said tube;
the improvement which comprises:
   5) following the coating of said tube with said alkaline viscose solution but before immersing the so-coated tube in said bath-tank of acid-containing precipitation liquid, and on the path taken by said tube, between the coating of said tube with said alkaline viscose solution and said immersing of said tube in said bath-tank, said path being up to 20 meters in length, applying aqueous acid-containing precipitating agent to the inside surface of said tube, to form regenerated cellulose thereon, thereby stiffening said inside surface of said tube before said tube is passed through said bath of acid containing precipitation liquid, the application of said aqueous acid-containing precipitating agent taking place without increasing the internal pressure of said tube and thereby avoiding harmful effects on said overlapping seam.

2. Method according to claim 1, characterised in that the preliminary precipitating bath is a divided current of the entire inner precipitating bath.

3. Method according to claim 1, characterised in that the preliminary precipitating bath is the entire inner precipitating bath supplied to the tube.

4. Method according to claim 1, characterised in that acid or buffer-salt concentrations of the inner precipitating bath are raised in relation to the outer precipitating bath and constitute a part of the quantities or the entire quantities needed for the first precipitation process.

5. Method according to one of claim 1, characterised in that only one of the component acids or buffer salts supplied to the process is added to the preliminary precipitating bath.

6. Method according to one of claim 1, characterised in that all the precipitating baths have a common collecting system, from which the inner and outer precipitating baths for the first precipitation process are supplied.

7. Method according to claim 1, characterised in that instead of the aqueous precipitating liquid for the purpose of preliminary precipitation the neutralisation and precipitation is effected via the supply of acid-forming oxides.

8. Method according to one of claim 1, characterised in that, in addition to the precipitating substances, supporting gases are used within the tube which replace the supporting internal devices entirely or partially.

9. Method according to one of claim 1, characterised in that the preliminary precipitating bath or inner precipitating bath and/or conducted gases contain substances that react with viscose or with viscose additives.

10. Method according to one of claim 1, characterised in that the internally pre-precipitated casing is drawn over a calibre device prior to the start of the main precipitation with outer precipitating bath.

11. Method according to one of claim 1, characterised in that the inner precipitation undergoes, above the precipitation container, an outer application of precipitating agents which supports the precipitation process.

12. Method according to claim 11, characterised in that the outer precipitation starts subject to a time delay in relation to the inner precipitation.

13. Method according to one of claim 1, characterised in that the air gap between the viscose-coating device and the level of the precipitating bath is replaced on the outside of the tube by a gas path or a gas-mixture path.

* * * * *

UNITED STATES PATENT AND TRADEMARK OFFICE
CERTIFICATE OF CORRECTION

PATENT NO : 5,820,934
DATED : October 13, 1998
INVENTOR(S): Basfeld, Klaus

It is certified that error appears in the above-identified patent and that said Letters Patent is hereby corrected as shown below:

| | |
|---|---|
| Title Page [87] "PCT Pub. No." | After "PCT Pub. No." delete "WO97/14752" and substitute --WO96/14752-- |
| Col. 14, Line 20 | Delete "one of" |
| Col. 14, Line 23 | Delete "one of" |
| Col. 14, Line 31 | Delete "one of" |
| Col. 14, Line 35 | Delete "one of" |
| Col. 14, Line 39 | Delete "one of" |
| Col. 14, Line 43 | Delete "one of" |
| Col. 14, Line 50 | Delete "one of" |

Signed and Sealed this

Seventh Day of September, 1999

Q. TODD DICKINSON

*Attest:*

*Attesting Officer*        *Acting Commissioner of Patents and Trademarks*